United States Patent
Wu

(10) Patent No.: US 9,772,437 B2
(45) Date of Patent: Sep. 26, 2017

(54) DISPLAY, DISPLAY ASSEMBLY, AND BACKLIGHT MODULE

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 116 days.

(21) Appl. No.: 14/499,538

(22) Filed: Sep. 29, 2014

(65) Prior Publication Data

US 2015/0092442 A1 Apr. 2, 2015

(30) Foreign Application Priority Data

Sep. 27, 2013 (TW) .............................. 102135208 A

(51) Int. Cl.
   - G02B 6/10 (2006.01)
   - G02B 6/26 (2006.01)
   - G02B 6/42 (2006.01)
   - F21V 8/00 (2006.01)

(52) U.S. Cl.
   CPC ......... *G02B 6/0061* (2013.01); *G02B 6/0053* (2013.01); *G02B 6/0036* (2013.01); *G02B 6/0078* (2013.01)

(58) Field of Classification Search
   CPC .... G02B 6/0033–6/0063; G02F 2001/133607; G02F 1/133524; G02F 1/133526; G02F 1/13336
   See application file for complete search history.

(56) References Cited

U.S. PATENT DOCUMENTS

| 7,134,778 B2* | 11/2006 | Kazuhiro ............. G02B 6/0038 362/561 |
| 2003/0231144 A1 | 12/2003 | Cho et al. |
| 2005/0248961 A1 | 11/2005 | Kazuhiro et al. |
| 2009/0323329 A1* | 12/2009 | Lin ........................ F21K 9/00 362/235 |
| 2010/0238090 A1* | 9/2010 | Pomerantz .......... G02F 1/13336 345/1.3 |
| 2011/0025594 A1* | 2/2011 | Watanabe ........... G02F 1/13336 345/102 |
| 2014/0218971 A1* | 8/2014 | Wu .................... F21V 33/0052 362/613 |

FOREIGN PATENT DOCUMENTS

CN 1467787 1/2004
CN 102830533 12/2012

* cited by examiner

*Primary Examiner* — Mariceli Santiago

(74) *Attorney, Agent, or Firm* — Steven Reiss

(57) ABSTRACT

A display includes a display panel, an image compensating portion, and a backlight module. The display panel includes a main display region and a periphery display region outside the main display region. The image compensating portion corresponding to the periphery display region includes a plurality of light guiding channels. The backlight module provides lights to the display panel. The backlight module comprises a plurality of first light collecting module. The first light collecting module focuses lights emitted from a first direction on a first light collecting axis parallel with an axis of the light guiding channel. The first direction is perpendicular to a first plane parallel with the display panel.

20 Claims, 17 Drawing Sheets

DISPLAY, DISPLAY ASSEMBLY, AND BACKLIGHT MODULE

CROSS-REFERENCE TO RELATED APPLICATIONS

This application is related to U.S. patent application Ser. No. 14/499,553 filed on Sep. 29, 2014, entitled "APPARATUS FOR COMPENSATING IMAGE OF DISPLAY AND DISPLAY ASSEMBLY", U.S. patent application Ser. No. 14/494,059 filed on Sep. 23, 2014, entitled "APPARATUS FOR COMPENSATING IMAGE OF DISPLAY AND DISPLAY ASSEMBLY", U.S. patent application Ser. No. 14/164,118 filed on Jan. 24, 2014, entitled "DISPLAY DEVICE, JOINT DISPLAY AND BACKLIGHT MODULE"; U.S. patent application Ser. No. 14/164,139 filed on Jan. 25, 2014, entitled "APPARATUS FOR COMPENSATING IMAGE OF DISPLAY AND METHOD FOR MANUFACTURING SAME"; U.S. patent application Ser. No. 14/164,140 filed on Jan. 25, 2014, entitled "APPARATUS FOR COMPENSATING IMAGE OF DISPLAY AND METHOD FOR MANUFACTURING SAME"; U.S. patent application Ser. No. 14/164,136 filed on Jan. 25, 2014, entitled "APPARATUS FOR COMPENSATING IMAGE OF DISPLAY, DISPLAY AND JOINT DISPLAY"; and U.S. patent application Ser. No. 14/164,137 filed on Jan. 25, 2014, entitled "DISPLAY ELEMENT, DISPLAY DEVICE AND JOINT DISPLAY". This application claims priority to Taiwanese Patent Application No. 102135208 filed on Sep. 27, 2013, the contents of which are incorporated by reference herein.

FIELD

The present disclosure relates to a display with an image compensating apparatus, a display assembly with at least two displays, and a backlight module.

BACKGROUND

In order to obtain a display panel of a relatively large size, it may be manufactured by a large number of serialization displays jointed together in a plane. The borders between two adjacent display panels jointing together are un-visible.

BRIEF DESCRIPTION OF THE FIGURES

Implementations of the present technology will now be described, by way of example only, with reference to the attached figures.

DETAILED DESCRIPTION

Figure 1:
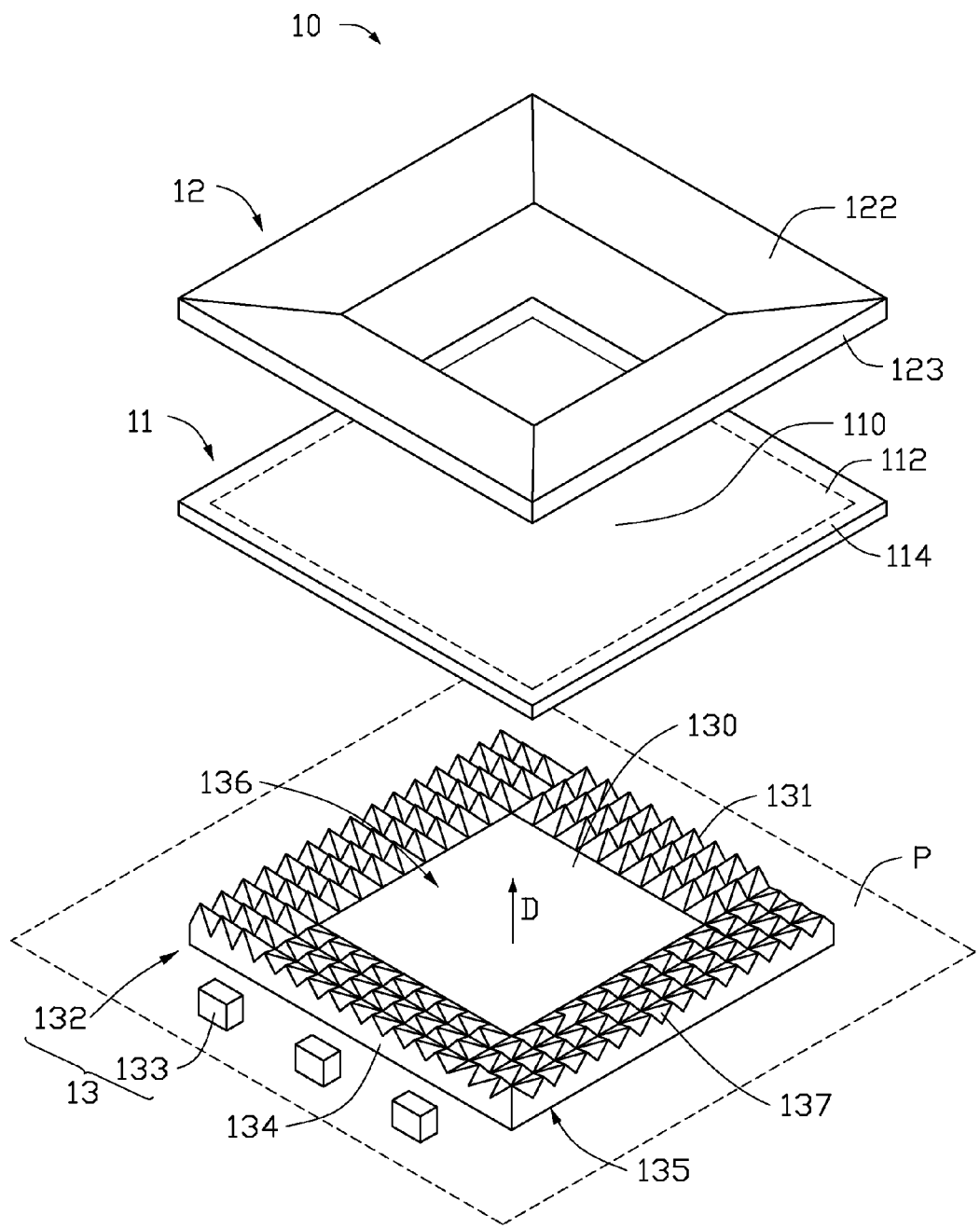
FIG. 1 is a partially exploded view of an embodiment of a display, the display including a display panel, an image compensating apparatus, and a backlight module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a display with a zero border.

FIG. 1 illustrates an embodiment of a display 10. The display 10 includes a display panel 11, an image compensating apparatus 12 located on the display panel 11, and a backlight module 13 located below the display panel 11. The display panel 11 is sandwiched between the image compensating apparatus 12 and the backlight module 13. In at least one embodiment, the display panel 11 is a liquid crystal display (LCD) panel or an organic light emitting display (OLED) panel.

The display panel 11 includes a main display region 110, a periphery display region 112 located outside of the main display region 110, and a non-display region 114 located outside the periphery display region 112. In at least one embodiment, the non-display region 114 is a border of the display 10.

Figure 2:
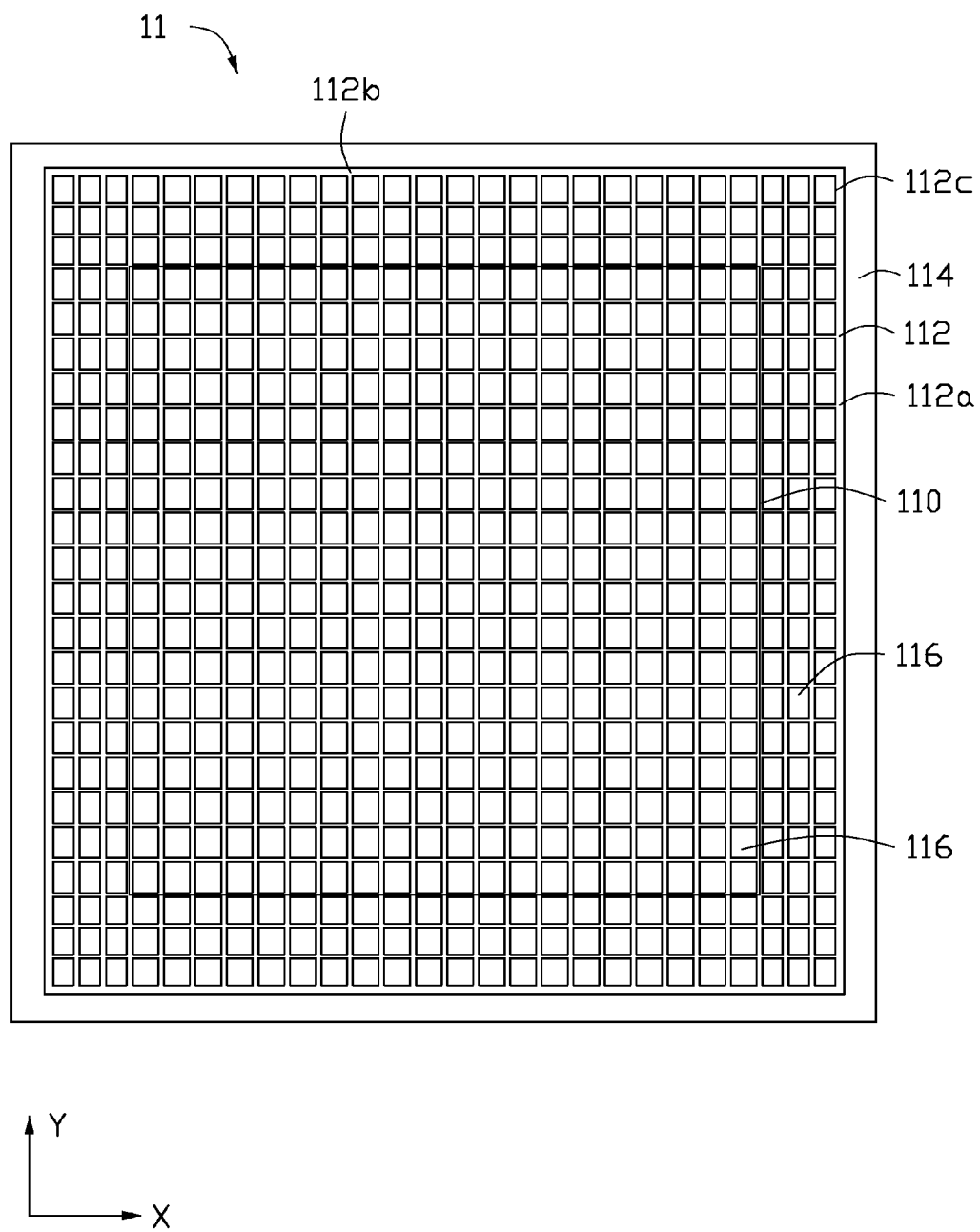
FIG. 2 is a diagrammatic view of an embodiment of the display panel of FIG. 1.

FIG. 2 illustrates that the main display region 110 and the periphery display region 112 includes a plurality of pixels 116 arranged as a matrix. Areas of the pixels 116 in the main display region 110 are constant, and each of adjacent pixels 116 in the main display region 110 are spaced by a first distance. Moreover, areas of the pixels 116 in the periphery display region 112 are constant, and each of adjacent pixels 116 in the periphery display region 112 are spaced by a second distance. A pixel density of the main display region 110 is less than a pixel density of the periphery display region 112. The first distance is greater than the second distance, and the constant area of the pixel 116 in the main display region 110 is greater than the constant area of the pixel 116 in the periphery display region 112. A length of the pixel 116 in the main display region 110 is greater than a length of the pixel 116 in the periphery display region 112, and a width of the pixel 116 in the main display region 110 is greater than a width of the pixel 116 in the periphery display region 112. The length of the pixel 116 is parallel with a direction X, and the width of the pixel 116 is parallel with a direction Y perpendicular to the direction X. In at least embodiment, widths of the pixels 116 in the periphery display regions 112a located on a right side and a left side of the main display region 110 are constant. A length of the pixel 116 in the periphery display region 112a is equal to a length of the pixel 116 in the main display region 110, and a width of the pixel 116 in the periphery display region 112a is less than a width of the pixel 116 in the main display region 110. Lengths of the pixels 116 in the periphery display regions 112b located on an upper side and a lower side of the main display region 110 are constant. A width of the pixel 116 in the periphery display region 112b is equal to a width of the pixel 116 in the main display region 110, and a length of the pixel 116 in the periphery display region 112b is less than a length of the pixel 116 in the main display region 110. A length of the pixel 116 in the periphery display regions 112c located at corners is less than a length of the pixel 116 in the main display region 110, and a width of the pixels 116 in the periphery display regions 112c is less than a width of the pixel 116 in the main display region 110. A length of the pixel 116 in the periphery display region 112c is equal to a length of the pixel 116 in the periphery region 112a, and a width of the pixel 116 in the periphery display region 112c is equal to a width of the pixel 116 in the periphery region 112b.

Figure 3:
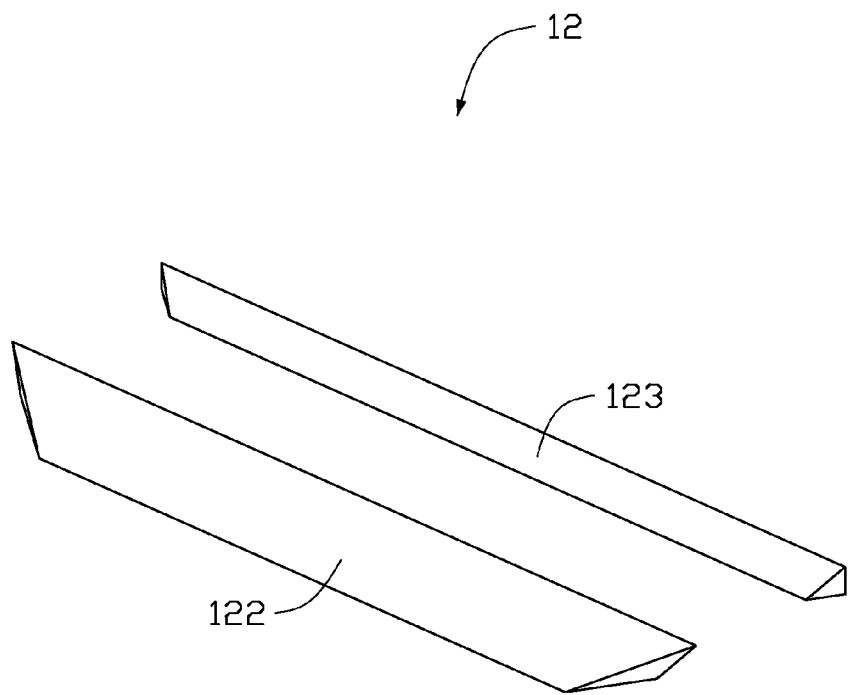
FIG. 3 is a partially enlarged view of an embodiment of the image compensating portion of FIG. 1.

FIG. 3 illustrates that the image compensating apparatus 12 includes four image compensating portions 122 set on the periphery display region 112 and four supporting portions 123 set on the non-display region 114. The image compensating portions 122 and the supporting portions 123 cooperatively define a hollow rectangular frame. The image compensating portion 122 extends an image covering region of the periphery display region 112 to cover an area combined by upper regions of the periphery display region 112 and the non-display region 114.

Figure 4:
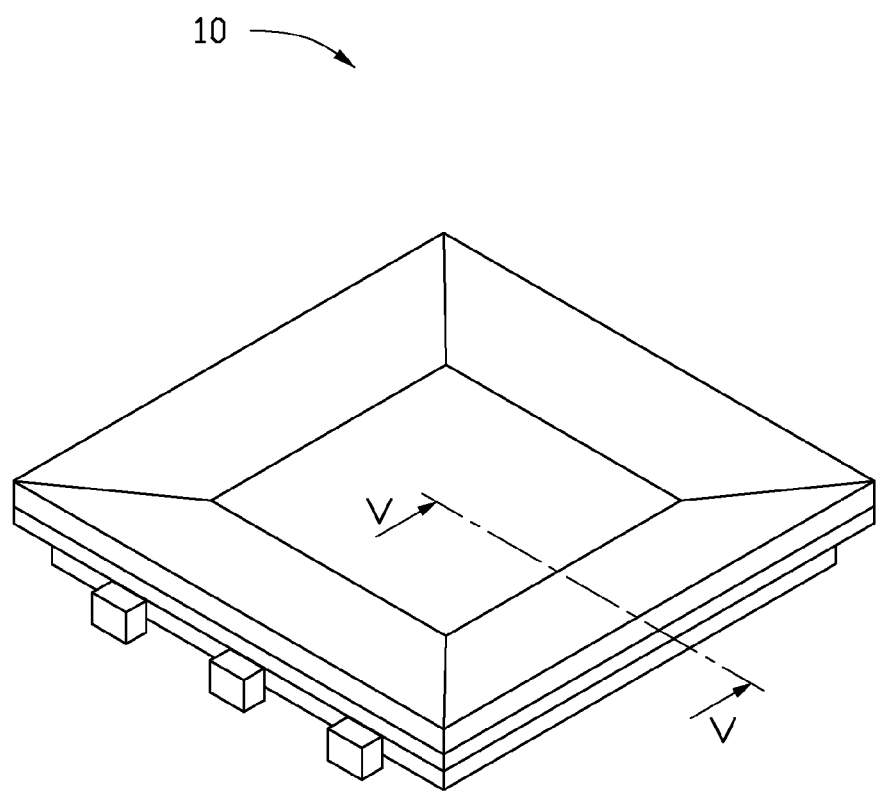
FIG. 4 is an isometric view of an embodiment of the display of FIG. 1.
Figure 5:
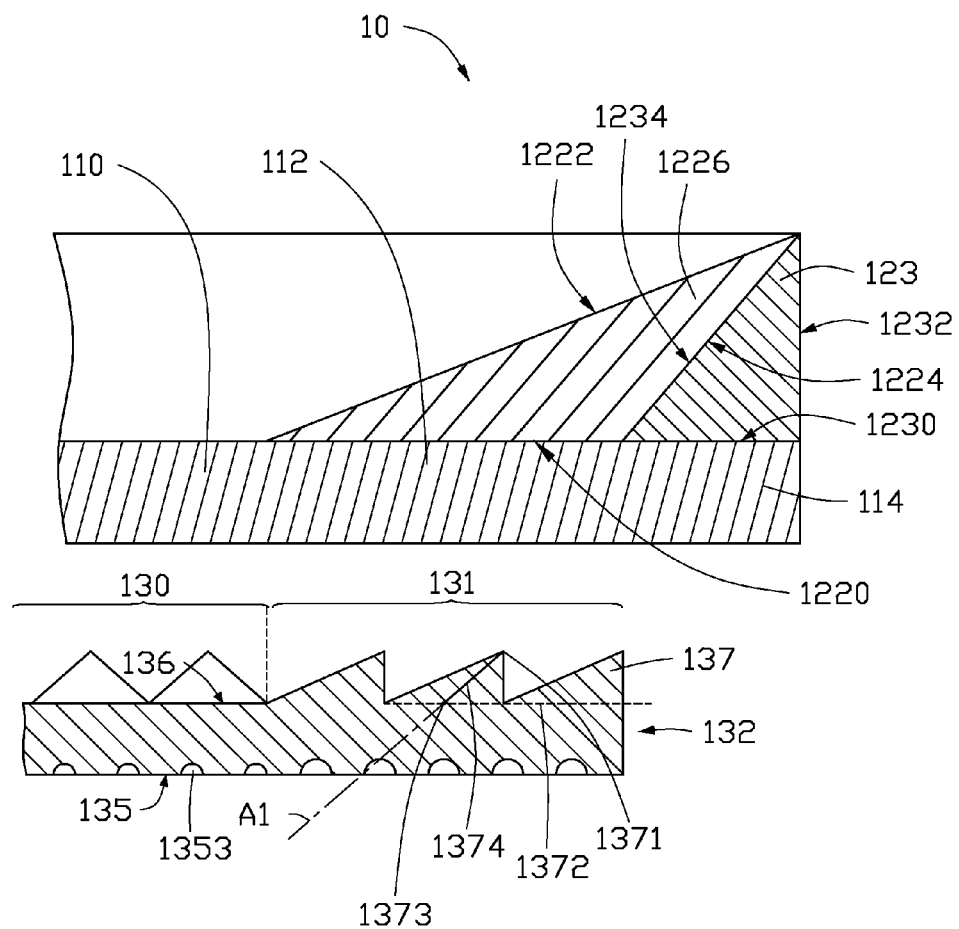
FIG. 5 is a cross-sectional view of an embodiment of the display of FIG. 4, taken along a line V-V thereof, the display including a plurality of light guiding channels.

FIGS. 4-5 illustrate that the image compensating portion 122 is a substantially obtuse triangle. The image compensating portion 122 includes a first light incident surface 1220 resisting the periphery display region 112, a first light emitting surface 1222 connected to the first light incident surface 1220, and an inclined surface 1224 connected between the first light incident surface 1220 and the first light emitting surface 1222. The first light incident surface 1220 faces the periphery display region 112. The first light emitting surface 1222 and the first light incident surface 1220 define an acute angle. A project area of the first light emitting surface 1222 on the first light incident surface 1220 is greater than an area of the first light incident surface 1220. The inclined surface 1224 resists the corresponding supporting portion 123, and is located on a side of the image compensating portion 122 away from the main display region 110. The inclined surface 1224 and the light incident surface 1220 define an obtuse angle. In at least one embodiment, the obtuse angle defined by the inclined surface 1224 and the first light incident surface 1220 is 135 degrees. The projection of the first light emitting surface 1222 on the first light incident surface 1220 covers the periphery display region 112 and the non-display region 114, thus the image compensating portion 122 extends an image covering region of the periphery display region 112 to cover an area combined by upper regions of the periphery display region 112 and the non-display region 114.

Figure 6:
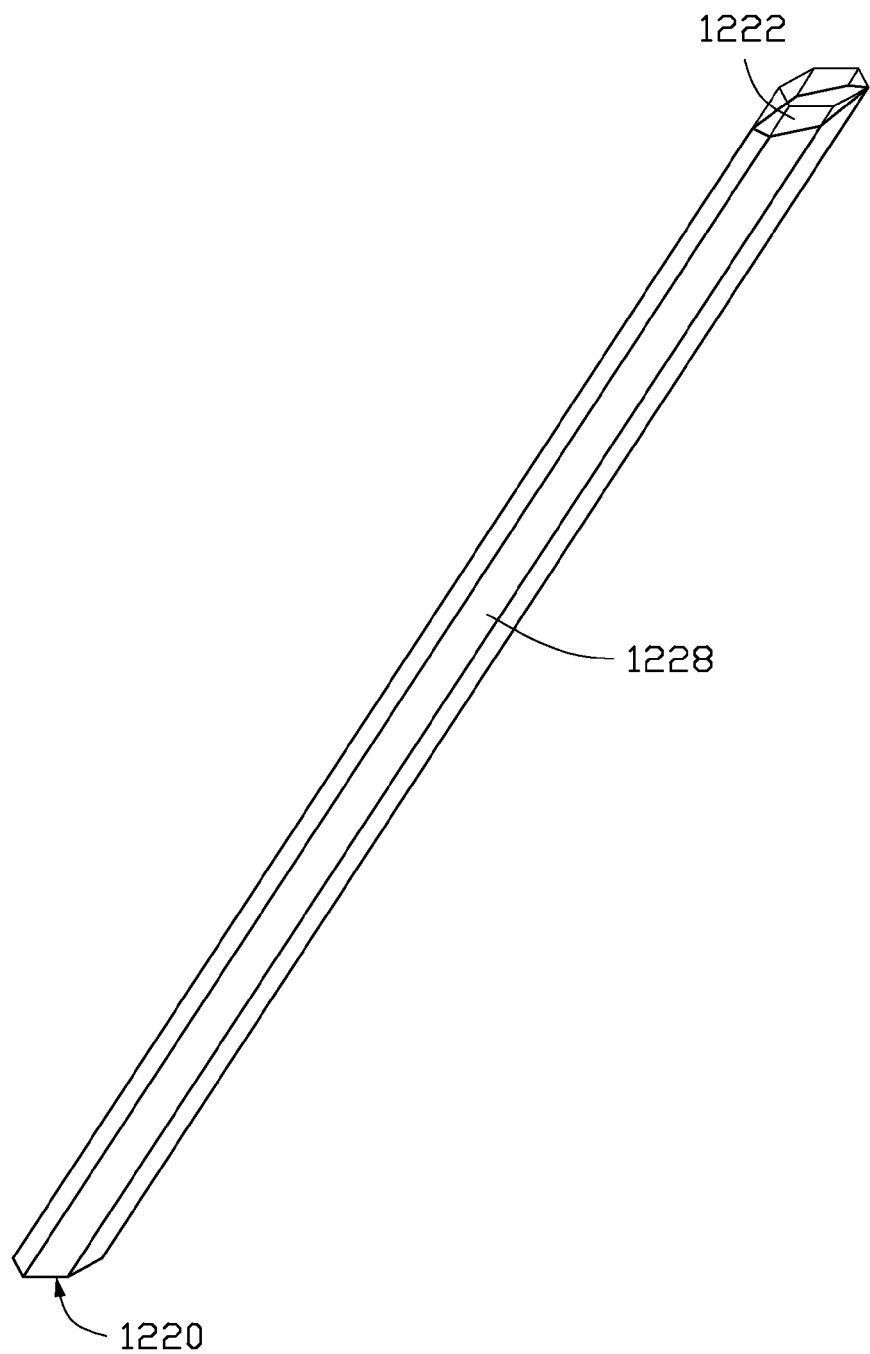
FIG. 6 is an isometric view of an embodiment of the light guiding channel of FIG. 5.

FIG. 6 illustrates that the image compensating portion 122 further includes a plurality of light guiding channels 1226 parallel with each other. The light guiding channel 1226 extends from the first light incident surface 1220 to the first light emitting surface 1222 along a predetermined direction. The light guiding channel 1226 guides light from the first light incident surface 1220 to be emitted from the first light emitting surface 1222 for extending an image covering region of the periphery display region 112. Cross sectional areas of the light guiding channels 1226 are constant, which means diameters of the light guiding channels 1226 are constant. A projection of the light guiding channel 1226 on the first light emitting surface 1220 is greater than a projection of the light guiding channel 1226 on the first light incident surface 1220. An extended degree of the images emitted by the light emitting surface 1222 is related to the of the arc light emitting surface 1222. In the embodiment, the light guiding channel 1226 is a light guiding fiber 1228. In other embodiments, the light guiding channels 1226 can be combined with a number of optical fibers, light guiding thin plates, silica fibers, glass fibers, or other light penetrating material.

The supporting portion 123 resists the image compensating portion 122 for supporting the connected image compensating portion 122. The supporting portion 123 includes a bottom surface 1230 resisting the non-display region 114, a first wall 1232 perpendicular to the bottom surface 1230, and a second wall 1234 interconnecting the bottom surface 1203 and the first wall 1232. The second wall 1234 angled with the first wall 1232 is coplanar to the first inclined surface 1224. The cross sectional area of the supporting portion 123 is a right triangle. In at least one embodiment, the supporting portion 123 is made of a transparent material. The second wall 1234 is bonded with the first inclined surface 1224 via a colloid. In other embodiments, the supporting portion 123 is made of a non-transparent opaque metal or plastic material.

When viewing the display 10, an image covering region of the periphery display region 112 is extended by the image compensating portion 122. A displaying region of the display 10 is being extended, and is greater than the size of the display 10. The display 10 has a zero border effect.

The backlight module 13 provides plane lights to the display panel 11. The backlight module 13 includes a main light emitting region 130 corresponding to the main display region 110, and a periphery light emitting region 131 corresponding to the periphery display region 112. The main light emitting region 130 and the periphery light emitting region 131 forms a light guiding plate 132. The backlight module 13 further comprises a light source 133 located on a side of the light guiding plate 132. The light source 133 provides light to the light guiding plate 132.

The light guiding plate 132 includes a second light incident surface 134 adjacent to the light source 133, a bottom surface 135 adjacent to the second light incident surface 134, and a second light emitting surface 136 opposite to the bottom surface 135.

The backlight module 13 further includes a plurality of first light collecting modules 137 on the second light emitting surface 136 of the periphery light emitting region 131. A first plane P is defined by the plane lights provided by the backlight module 13, and is parallel with the display panel 11. A first direction D is perpendicular to the first plane P. The first light collecting module 137 focuses light emitted from the first direction D on a first light collecting axis A1. The first light collecting axis A1 is parallel with an axis of the light guiding channel 1226. The light guiding channel 1226 and the first plane P define an acute angle, and the first light collecting axis A1 and the first plane P define an acute angle. The first light collecting module 137 is a substantially prism shaped. The first light collecting module 137 includes an apex 1371 and a bottom wall 1372 with a central point 1373. A line 1374 connecting the apex 1371 and the central point 1373 angles with the first plane P. In at least embodiment, the line 1374 overlaps the light collecting axis A1. The first light collecting module 137 is a substantially rectangular pyramid.

Figure 7:
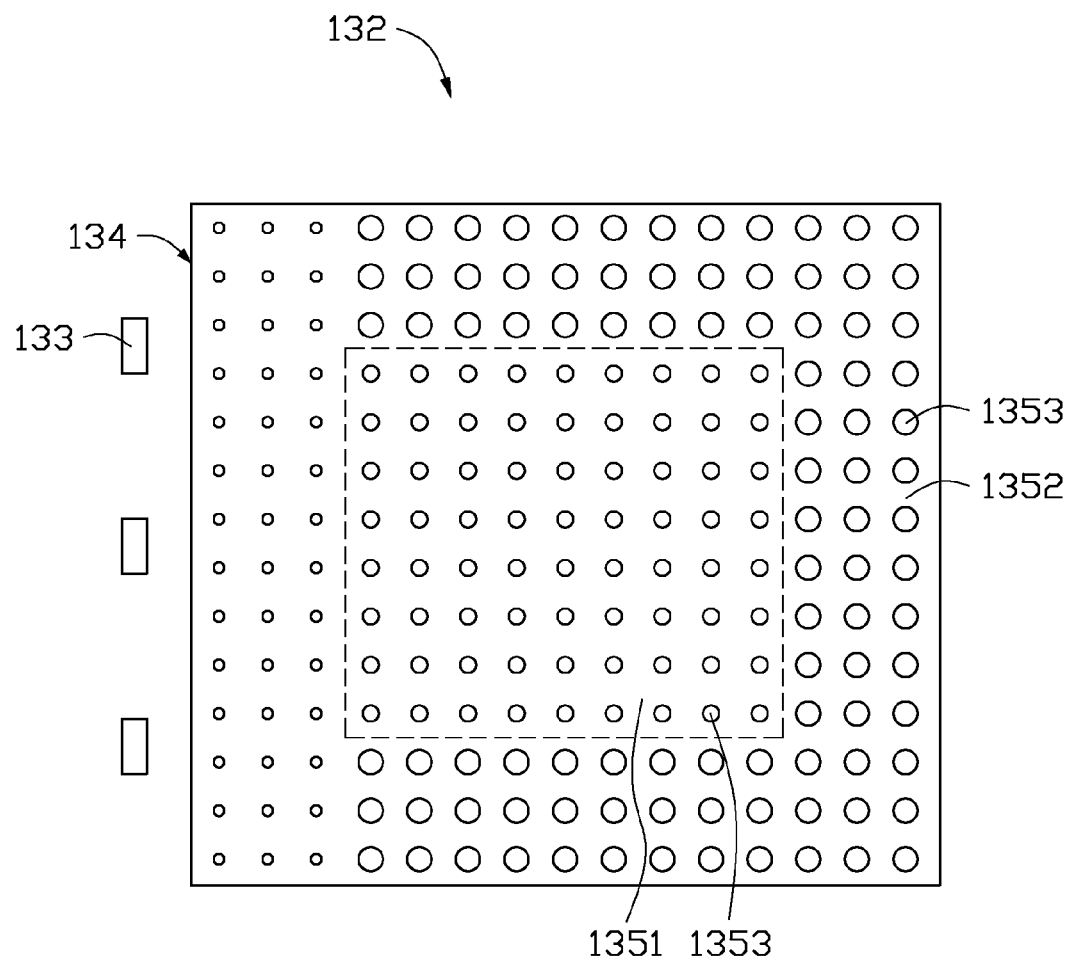
FIG. 7 is a diagrammatic view of an embodiment of the backlight module of FIG. 1 viewed from another angle.

FIG. 7 illustrates that the backlight module 13 viewed from another aspect. The bottom surface 135 includes a first region 1351 corresponding to the main display region 110 and a second region 1352 corresponding to the periphery display region 112. The bottom surface 135 comprises a plurality of net points 1353. Each net point 1353 is printed on the bottom surface 135. A ratio between an area of the net points 1353 in the first region 1351 and an area of the net points 1353 in the second region 1352 is within a range of 1.5 to 4, thus a light intensity in the periphery display region 112 is greater than a light intensity in the main display region 110. An intensity of lights emitted by the periphery display region 112 is reduced by passing through the image compensating apparatus 12 to equal an intensity of light emitted by the main display region 110. Based on the focusing function of the first light collecting module 137, light is parallelly emitted into the light guiding channel 1226, thus an utilization of lights emitted through the image compensating portion 122 and a display effect of the periphery display region 112 are improved.

Figure 8:
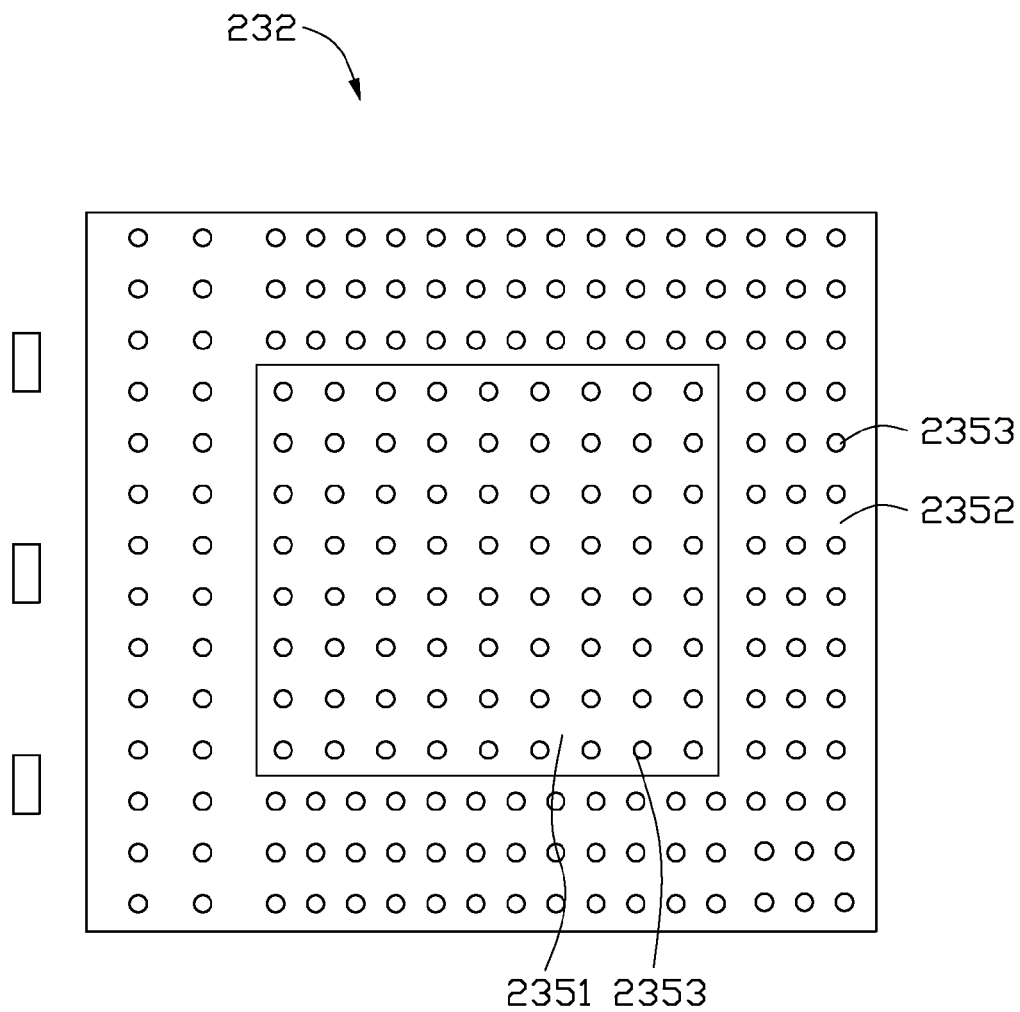
FIG. 8 is a diagrammatic view of a second embodiment of the backlight module of FIG. 1.

FIG. 8 illustrates that a second embodiment of the backlight module 23. An area of the net points 2353 in the first region 2351 is equal to an area of the net points 2353 in the second region 2352. A density of the net points 2353 in the first region 2351 is less than a density of the net points 2353 in the second region 2352.

Figure 9:
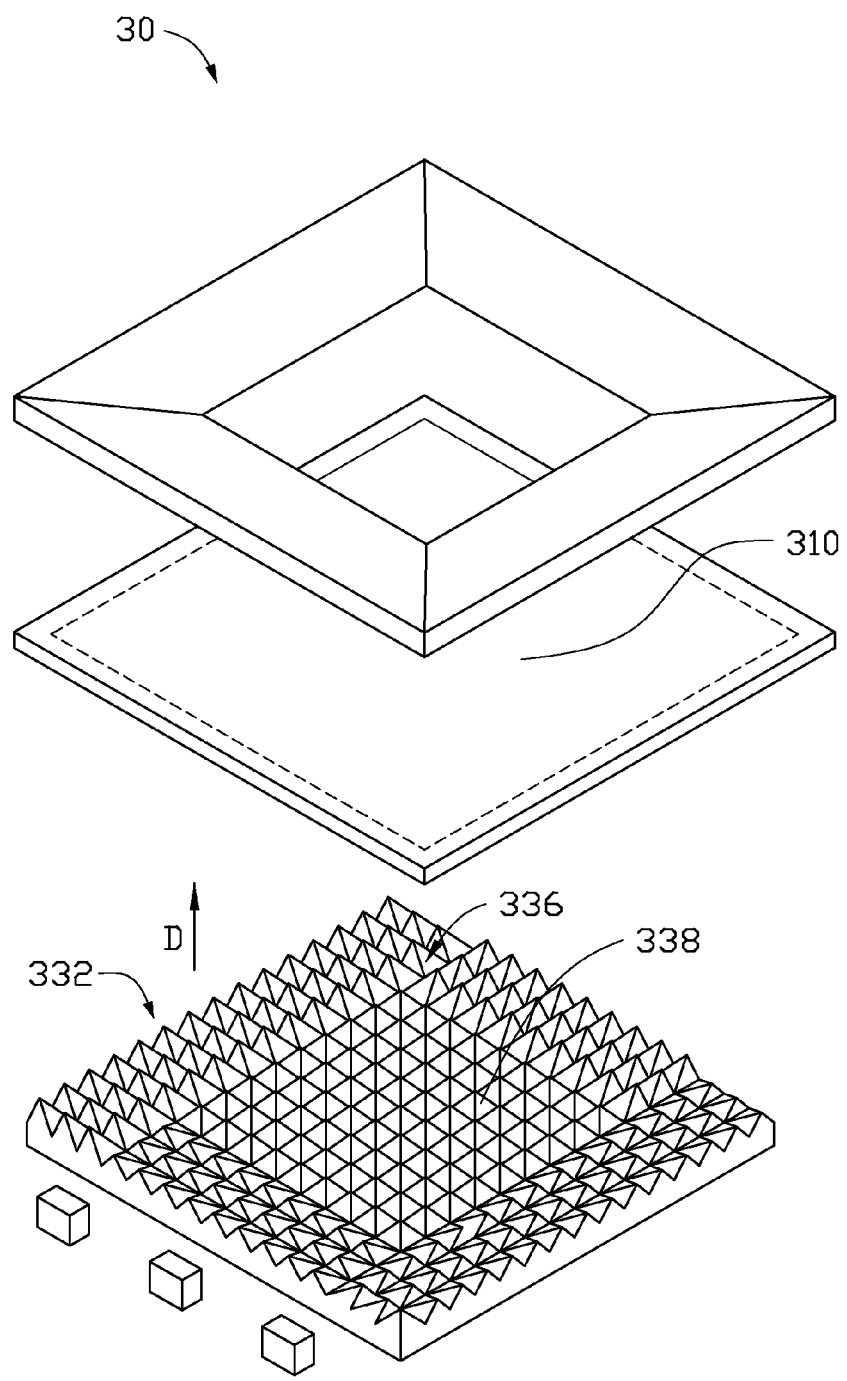
FIG. 9 is a partially exploded view of a second embodiment of the display.
Figure 10:
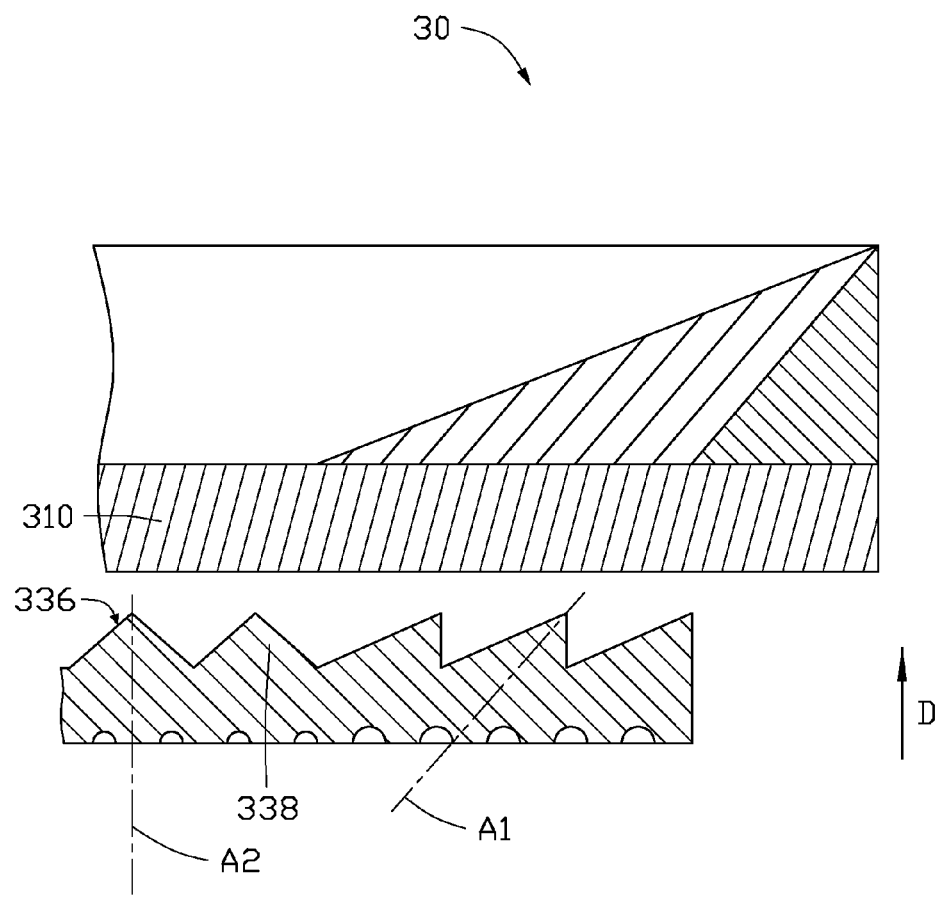
FIG. 10 is a diagrammatic view of an embodiment of the display of FIG. 9.

FIGS. 9-10 illustrate a second embodiment of the display 30. The light guiding plate 332 further includes a second light collecting module 338 corresponding to the main display region 310. The second light collecting module 338 focuses light emitted from the first direction D on a second light collecting axis A2. The second light collecting axis A2 is parallel with the first direction D.

Figure 11:
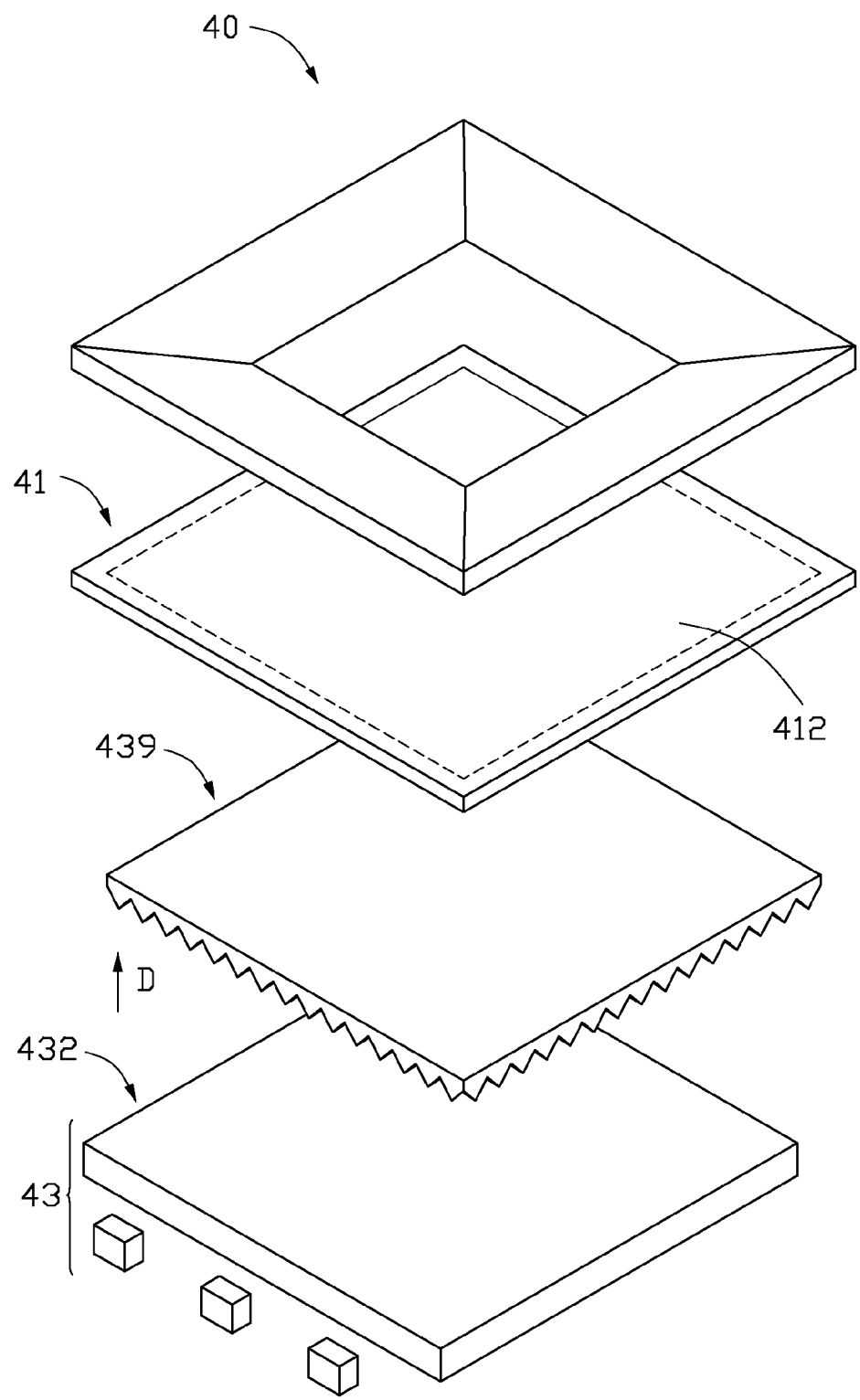
FIG. 11 is a partially exploded view of a third embodiment of the display, the display including a prism module.
Figure 12:
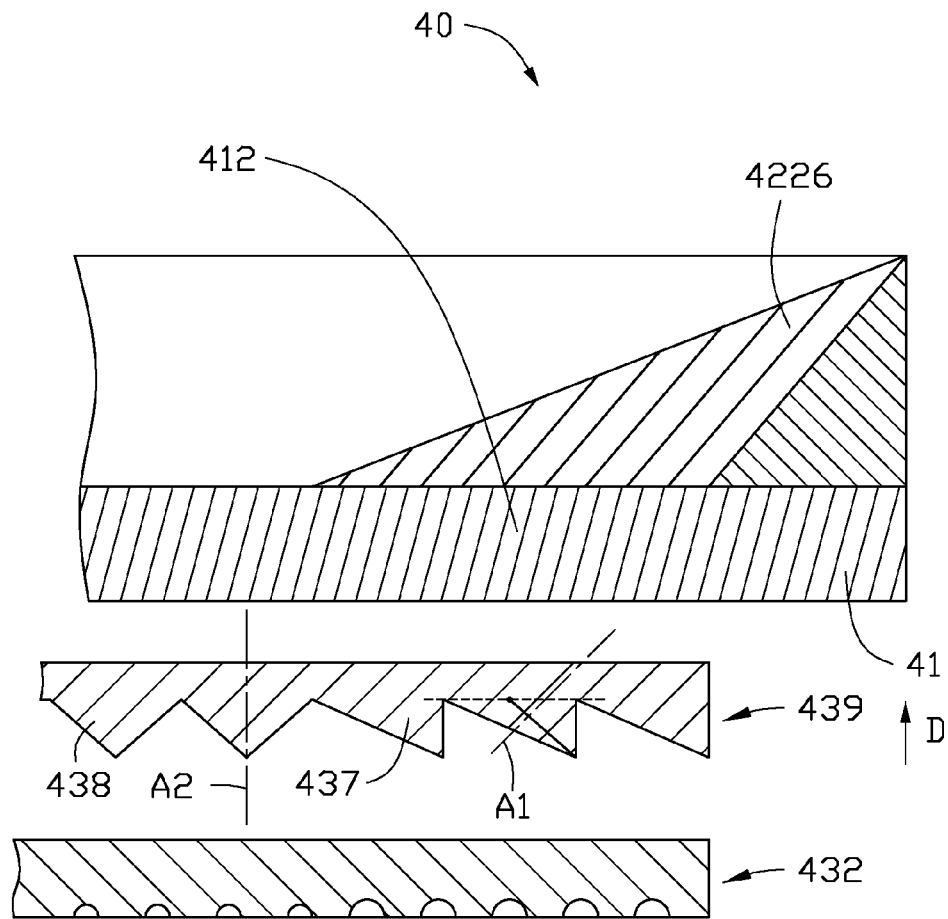
FIG. 12 is a diagrammatic view of an embodiment of the display of FIG. 11.

FIGS. 11-12 illustrate a third embodiment of the display 40. The backlight module 43 of the display 40 further includes a prismatic lens 439 sandwiched between the display panel 41 and the light guiding plate 432. An apex of the prismatic lens 439 is adjacent to the light guiding plate 432.

Figure 13:
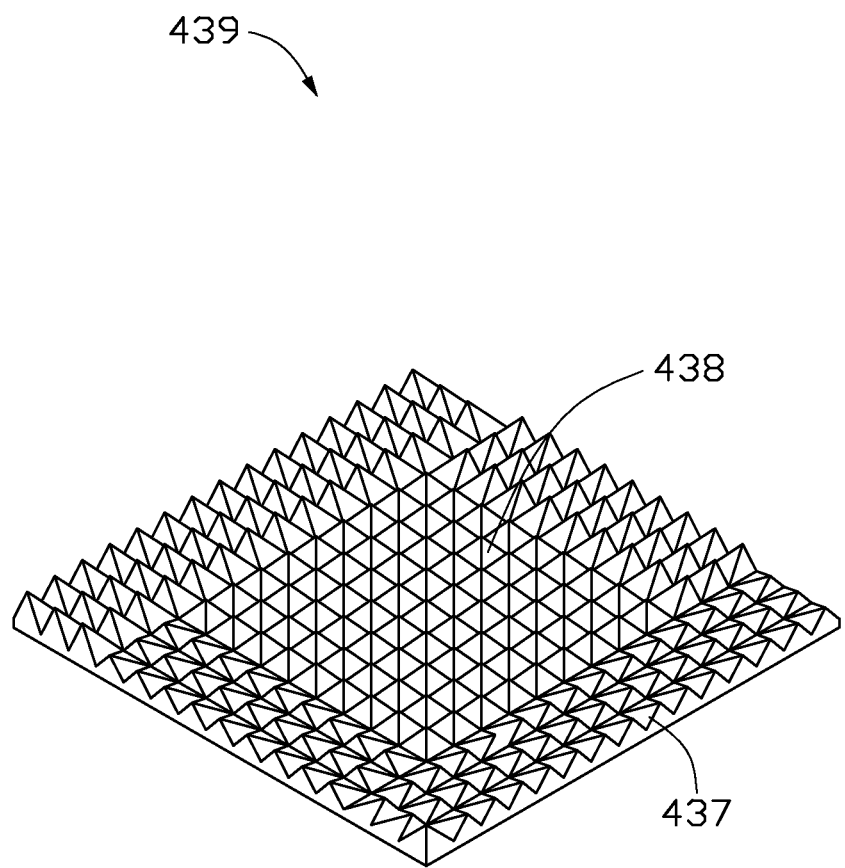
FIG. 13 is an isometric view of an embodiment of the prism module of FIG. 11.

FIG. 13 illustrates the prismatic lens 439 viewed from another aspect. The prismatic lens 439 includes a light incident surface, a first light collecting module 437 corresponding to the periphery display module 412, and a second light collecting module 438 corresponding to the main display region 410. The first light collecting module 437 and the second light collecting module 438 face the light guiding plate 432. Light emitted into the first light collecting module 437 is focused on a first light collecting axis A1 by the first light collecting module 437. Light emitted into the second light collecting module 438 is focused on a second light collecting axis A2 by the second light collecting module 438. The first light collecting axis A1 is parallel with an axis of the light guiding channel 4226. The second light collecting axis A2 is parallel with the first direction D.

Figure 14:
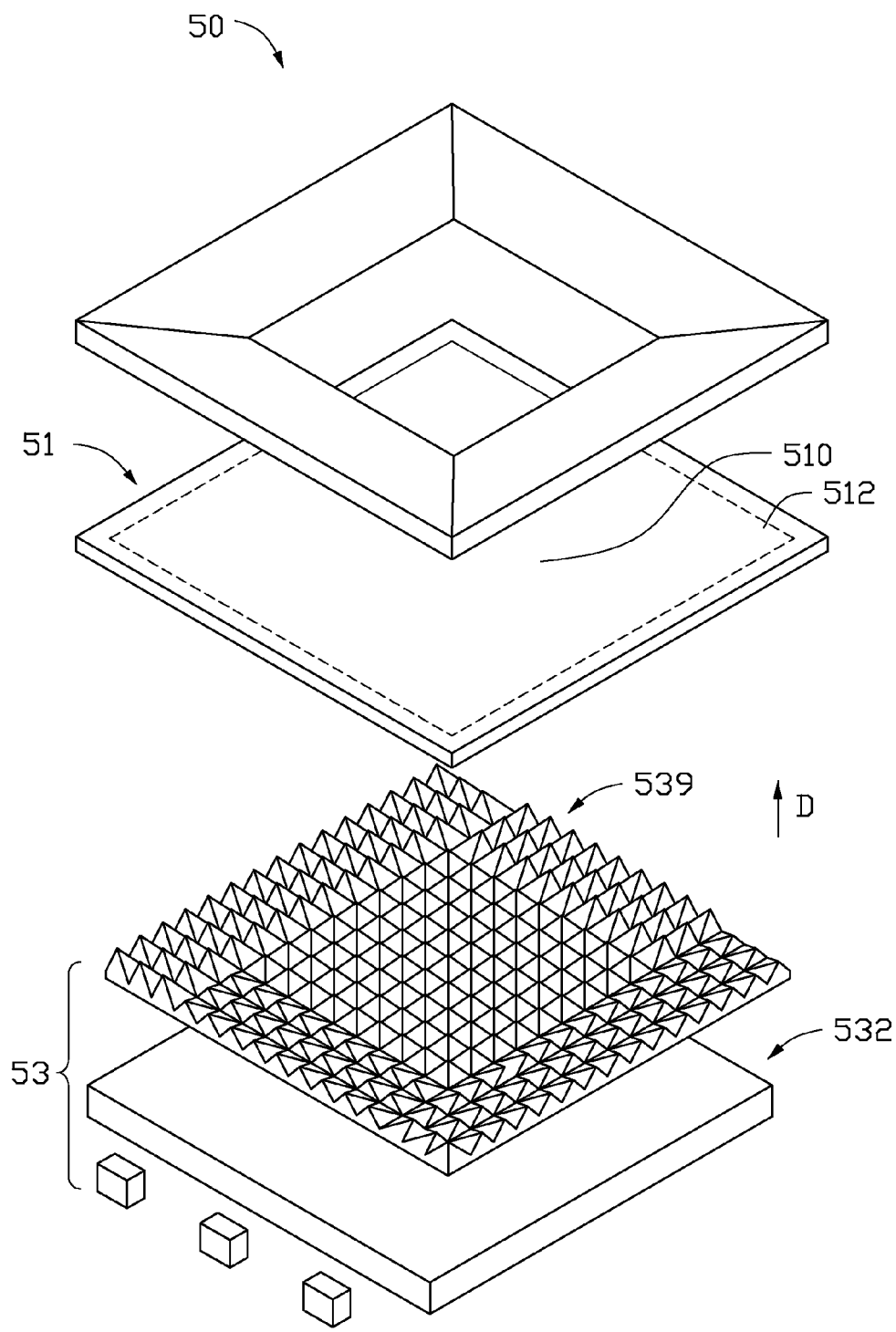
FIG. 14 is a partially exploded view of a fourth embodiment of the display.
Figure 15:
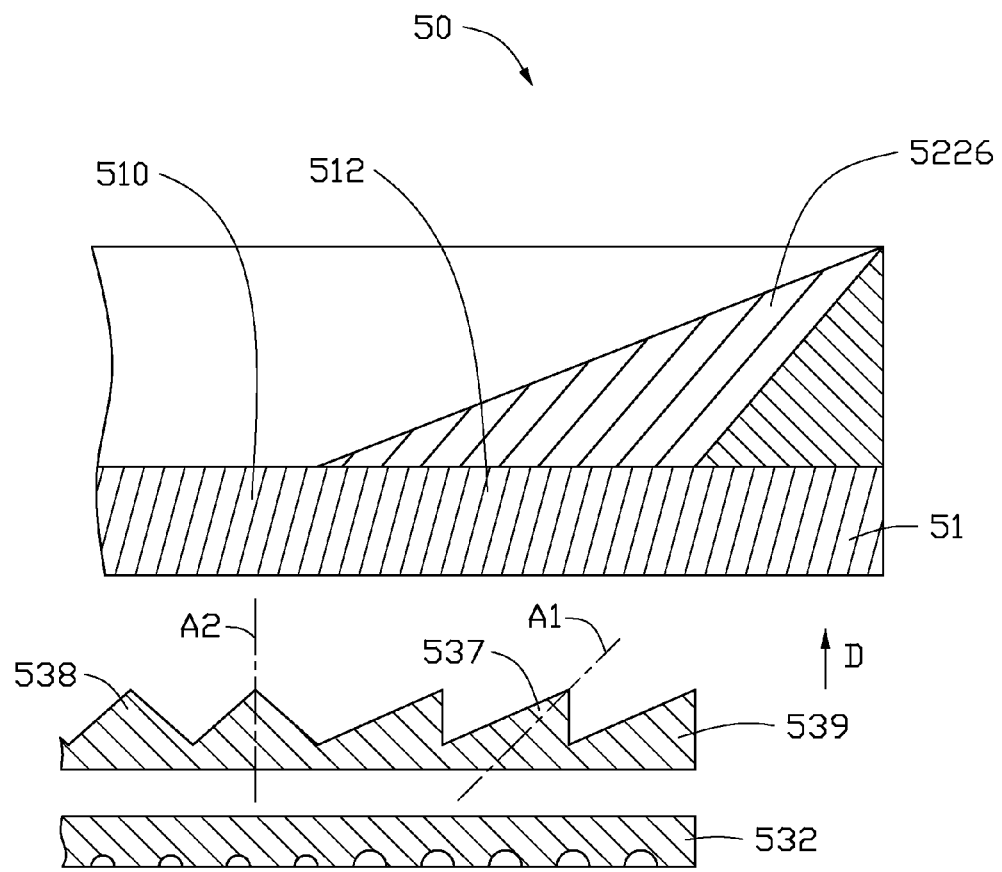
FIG. 15 is a diagrammatic view of an embodiment of the display of FIG. 14.

FIGS. 14-15 illustrate a fourth embodiment of the display 50. The backlight module 53 of the display 50 further includes a prismatic lens 539 sandwiched between the display panel 51 and the light guiding plate 532. An apex of the prismatic lens 539 is adjacent to the display panel 51. The first light collecting module 537 and the second light collecting module 538 face the display panel 51. Light emitted into the first light collecting module 537 is focused on a first light collecting axis A1 by the first light collecting module 537. Light emitted into the second light collecting module 538 is being focused on a second light collecting axis A2 by the second light collecting module 538. The first light collecting axis A1 is parallel with an axis of the light guiding channel 4226. The second light collecting axis A2 is parallel with the first direction D.

Figure 16:
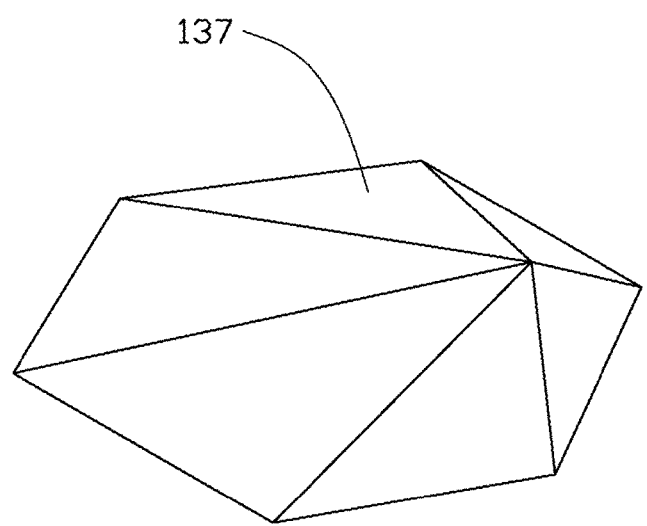
FIG. 16 is an isometric view of an embodiment of the light collecting module of FIG. 1, 8-9, 11, or 14.

FIG. 16 illustrates that the first light collecting module 137 is a substantially hexagonal pyramid. The light collecting modules 237, 337, 437, and 547 can be substantially similar in shape as the first light collecting module 137.

Figure 17:
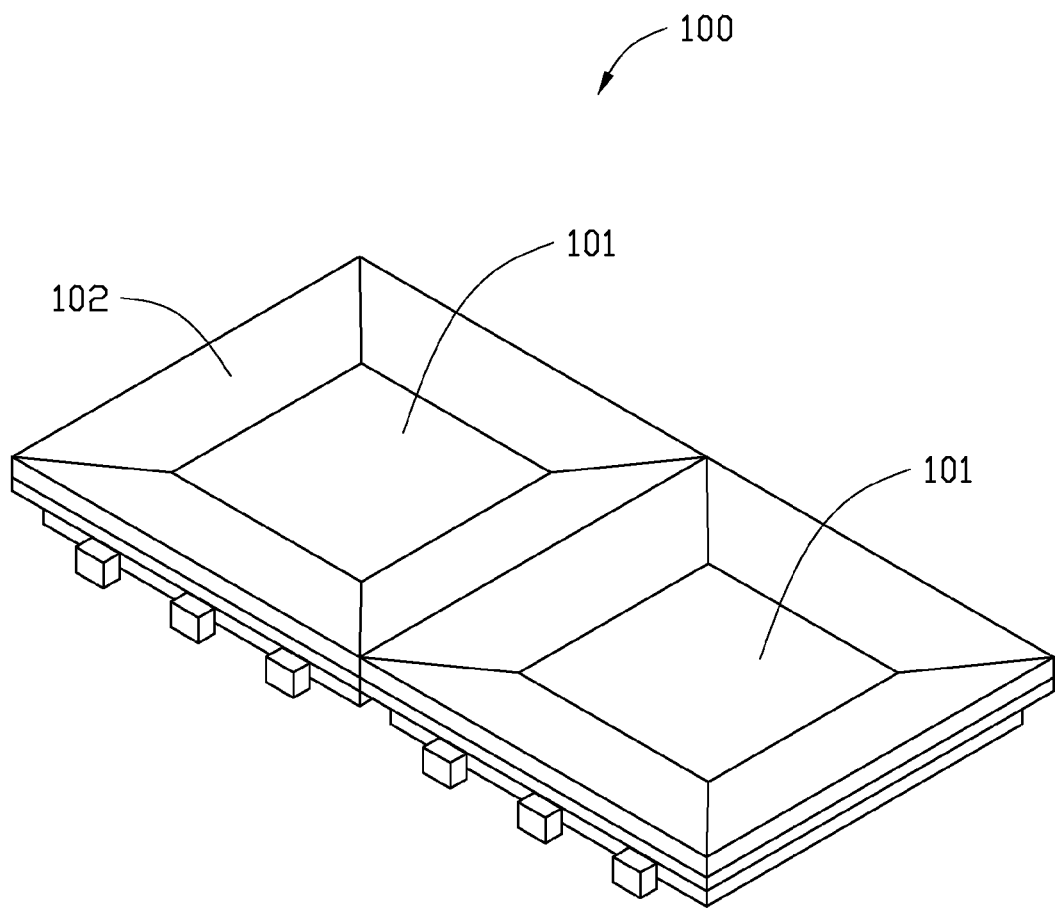
FIG. 17 is an isometric view of an embodiment of the display assembly jointed by two displays.

FIG. 17 illustrates the display assembly 100 with two displays 101 parallel jointed together. The display 101 of the display assembly 100 can be one of the displays 10, 20, 30, 40, 50, or any suitable combination thereof.

In use, the image compensating apparatus 12 extends an image covering region of the display 10 for covering the non-display region 114, thus borders of the display 10 is invisible and the visual effect of the display 10 is improved The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:
1. A display comprising:
 a display panel with a main display region and a periphery display region outside the main display region;
 an image compensating portion corresponding to the periphery display region, configured to extend an image covering region of the periphery display region and comprising:
 a light incident surface corresponding to the periphery display region;
 a light emitting surface; and
 a plurality of light guiding channels extended from the light incident surface to the light emitting surface; and
 a backlight module for providing light beams to the display panel and comprising:
 a plurality of first light collecting modules corresponding to the periphery display region;

wherein the first light collecting module focuses light beams emitted from a first direction on a first light collecting axis, the first direction is perpendicular to a first plane parallel with the display panel, and the first light collecting axis is parallel with an axis of the light guiding channel.

2. The display of claim 1, wherein the first light collecting module is substantially prism shaped; the first light collecting module comprises an apex and a bottom wall with a central point; a line connected the apex and the central point angles with the first plane; the line is parallel with the first light collecting axis.

3. The display of claim 2, wherein the first light collecting module is a substantially rectangular pyramid.

4. The display of claim 2, wherein the first light collecting module is a substantially hexagonal pyramid.

5. The display of claim 1, wherein the backlight module further comprises a plurality of second light collecting modules corresponding to the main display region; the second light collecting module focuses lights emitted from the first direction on a second light collecting axis; the second light collecting axis is parallel with the first direction.

6. The display of claim 1, wherein the backlight module further comprises a light guiding plate.

7. The display of claim 6, wherein the light guiding plate comprises a second light incident surface, a bottom surface adjacent to the second light incident surface, and a second light emitting surface opposite to the bottom surface; the bottom surface comprises a plurality of net points; a density of the net point in the first region is less than a density of the net point in the second region.

8. The display of claim 7, wherein a ratio between an area of the net point in the first region and an area of the net point in the second region is within a range of 1.5 to 4.

9. The display of claim 8, wherein an area of the net point in the first region is equal to an area of the net point in the second region.

10. The display of claim 6, wherein the backlight module further comprises a prismatic lens sandwiched between the display panel and the light guiding plate; the first light collecting module and the second collecting module are located on the prismatic lens.

11. The display of claim 10, wherein an apex of the prismatic lens is adjacent to the light guiding plate.

12. The display of claim 10, wherein an apex of the prismatic lens is adjacent to the display panel.

13. The display of claim 1, wherein the image compensating portion extends an image covering region of the periphery display region to cover an area combined by upper and outside regions of the periphery display region.

14. A display assembly comprising:
at least two displays arranged in parallel, comprising:
a display panel with a main display region and a periphery display region outside the main display region;
an image compensating portion corresponding to the periphery display region, configured to extend an image covering region of the periphery display region; and
a backlight module for providing light beams to the display panel;
wherein the image compensating portion comprises a first light incident surface corresponding to the periphery display region, a first light emitting surface, and a plurality of light guiding channels extended from the light incident surface to the light emitting surface; the backlight module comprises a plurality of first light collecting modules corresponding to the periphery display region; the first light collecting module focuses light beams emitted from a first direction on a first light collecting axis; the first direction is perpendicular to a first plane; the first plane is parallel with the display panel; the first light collecting axis is parallel with an axis of the light guiding channel.

15. The display assembly of claim 14, wherein the first light collecting module is substantially prism shaped; the first light collecting module comprises an apex and a bottom wall with a central point; a line connected the apex and the central point angles with the first plane; the line is parallel with the first light collecting axis.

16. The display assembly of claim 14, wherein the backlight module further comprises a plurality of second light collecting modules corresponding to the main display region; the second light collecting module focuses lights emitted from the first direction on a second light collecting axis; the second light collecting axis is parallel with the first direction.

17. The display assembly of claim 14, wherein the backlight module further comprises a light guiding plate; the first light collecting module and the second light collecting module are located on the second light emitting surface.

18. The display assembly of claim 17, wherein the backlight module further comprises a light guiding plate and a prismatic lens sandwiched between the display panel and the light guiding plate; the first light collecting module and the second collecting module are located on the prismatic lens.

19. The display assembly of claim 18, wherein an apex of the prismatic lens is adjacent to the display panel.

20. A display module serving as a planar light source for a display panel, comprising:
a main emitting region;
a periphery emitting region surrounding the main emitting region;
a plurality of first light collecting modules corresponding to the periphery emitting region, the planar light source formed by the display module defining a first plane, the plurality of first light collecting modules focusing light beams emitted from a first direction on a first light collecting axis; the first direction perpendicular to the first plane; the first light collecting axis being inclined to the first direction; and
a plurality of second light collecting modules corresponding to the main display region, the plurality of second light collecting modules focusing light beams emitted from the first direction on a second light collecting axis; the second light collecting axis is parallel with the first direction.

* * * * *